UNITED STATES PATENT OFFICE.

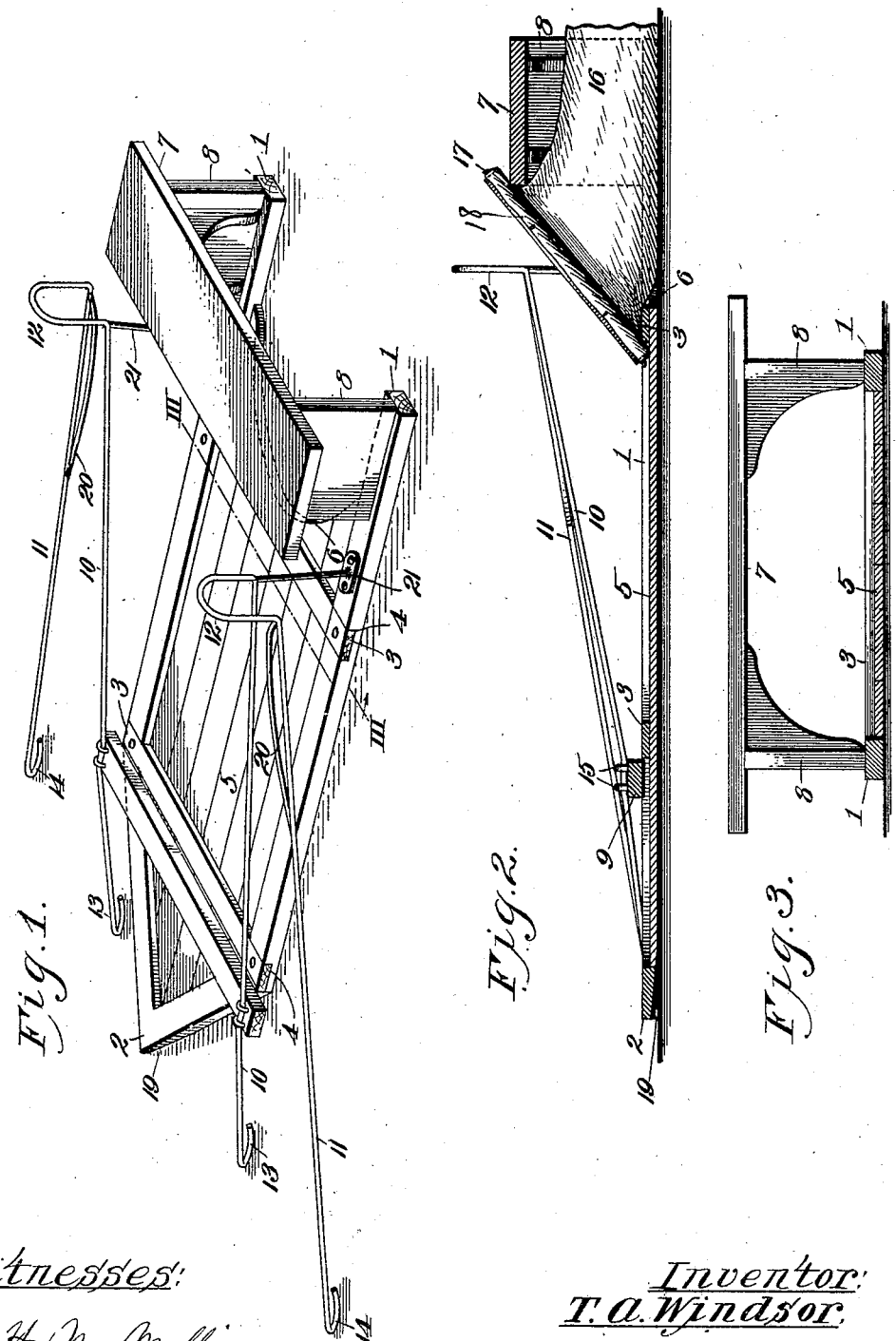

THADDEUS A. WINDSOR, OF ELGIN, OKLAHOMA.

COTTON-PICKER'S SLED.

No. 886,451.  Specification of Letters Patent.  Patented May 5, 1908.

Application filed August 2, 1906. Serial No. 328,951.

*To all whom it may concern:*

Be it known that I, THADDEUS A. WINDSOR, a citizen of the United States, residing at Elgin, in the county of Comanche, Oklahoma, have invented certain new and useful Improvements in Cotton-Pickers' Sleds, of which the following is a specification.

This invention relates to a cotton picker's sled, and has for its object to produce a device of this character upon which the picker may sit, kneel or stand as it is drawn between rows of cotton plants and pick the cotton from the bolls with ease and celerity.

A further object is to produce a device of this character which will gather up and gradually elevate the lower branches of the plants and to which the sack can be conveniently attached in such a position that the cotton can be readily deposited therein.

With these general objects in view and others as hereinafter appear, the invention consists in certain novel and peculiar features of construction and organization as hereinafter described and claimed; and in order that it may be fully understood reference is to be had to the accompanying drawing, in which—

Figure 1, is a perspective view of a cotton picker's sled embodying my invention. Fig. 2, is a central vertical section of the same equipped with a hoop or other device to distend the mouth of the sack to receive the cotton. Fig. 3, is a cross section on the line III—III of Fig. 1.

In the said drawing, 1 indicates a pair of parallel bars connected at their front ends by a V-shaped cross piece 2, and at intermediate points by cross bars 3, the bars 1 being preferably notched as at 4 to receive the ends of the cross bars. This rigid frame is provided with a platform 5, consisting preferably of a series of longitudinal planks nailed or otherwise secured to the undersides of cross bars 3 and having their lower sides in substantially the same plane as the corresponding surfaces of the bars 1 and the rear end of the platform forward of and under the seat hereinafter described, is preferably cut away as at 6, to provide an opening, as shown.

7 indicates a seat mounted upon standards 8 erected upon bars 1 at opposite sides of opening 6, and said seat by preference projects outwardly beyond the standards as shown.

9 indicates a cross bar secured to the front portion of the frame and projecting beyond the sides of the same if desired and forming a support for a pair of gathering frames formed of iron rods by preference, each frame consisting of an inner arm 10 and an outer arm 11 united at their rear ends by an arch 12, and having their front ends bent downward and rearward to form the points 13 and 14 respectively. These frames are arranged with their arches projecting a little higher than the plants, and incline downward and forward with the inner arms preferably secured to the supporting bar 9, as at 15. The arms 10 of the frames are substantially parallel by preference and the arms 11 diverge forwardly with respect to arms 10. To bring the branches of the plants nearer the operator, the space between arms 10 and 11 may be contracted by attaching bowed guides 20 to arms 11, as shown, and the rear or arched ends of the frames can be braced by standards 21 rising from the bars 1.

In practice a horse is hitched to the front end of the sled and drags the same slowly through the space between adjacent rows of cotton plants, with the driver, who also picks the cotton, preferably seated upon seat 7. The cotton sack 16 is arranged under the seat to trail behind the machine upon the ground and has its front end forward of the seat and secured to hooks 17 carried by a hoop 18, utilized for the purpose of distending or holding open the mouth of the sack, and said hoop by preference rests on the platform in an inclined position, being held reliably by leaning against the front edge of cross bar 3 and the front edge of the seat as shown in Fig. 2, it being understood, however, that the hoop may rest upon the knees of the picker with the sack extending down between his legs. It will also be noted that as the sled is dragged forward the bulk cotton placed in the sack works its way toward the rear end of the same so that the picker shall not be compelled at very frequent intervals to force the cotton back or to raise the sack to a vertical position to accomplish such purpose. The opening in the rear end of the platform is provided in order that practically the entire lower surface of the sack may come in contact with the ground so as to more reliably insure rearward movement of the cotton in the sack, this rearward movement occurring because the center of gravity of the cotton as it is piled in the mouth of the sack by the picker is high and the forward movement of the sack tends to cause such sacked cotton to work or roll toward the bottom or closed end of the sack.

As the sled is drawn along it rides over slight obstructions because like the pointed ends of the frames, its front end is beveled upward slightly by preference, as at 19. In the progress of the sled the longer low-lying branches of the cotton plants are picked up by arms 10 and 11 and are bunched to a certain extent between said arms where they are within more convenient reach of the picker who can pick the cotton as the sled is drawn slowly along or can rise from his seat and thus be enabled to pick the cotton along the entire length of the sled in the interim between the movements of the latter.

The ends of the seat are projected laterally beyond the sides of the sled so that the operator while seated thereon upon one end or the other, may reach a greater distance beyond the sides of the sled for cotton inaccessible when upon the middle of the seat.

With a sled of this character a woman can pick cotton without undue fatigue and at the same time a child which cannot be left at home, may ride upon the platform.

From the above description it will be apparent that I have produced a cotton picker's sled possessing the features of advantage enumerated as desirable and I wish it to be understood that I do not desire to be limited to the exact details of construction shown and described as obvious modifications will suggest themselves to one skilled in the art.

Having thus described the invention what I claim as new and desire to secure by Letters Patent, is:—

1. A cotton picker's sled, comprising a sled frame to drag upon the ground, and gathering frames flanking the said sled frame and each comprising inner and outer arms connected at their rear ends and having their front ends resting upon the ground and formed to ride over ordinary irregularities in the surface thereof.

2. A cotton picker's sled, comprising a sled frame to drag upon the ground, and gathering frames flanking the said sled frame, and each comprising inner and outer arms connected at their rear ends and having their front ends resting upon the ground and formed to ride over ordinary irregularities in the surface thereof; said arms being pitched downwardly and forwardly.

3. A cotton picker's sled, comprising a sled to drag upon the ground, and gathering frames flanking the said sled frame, and each comprising inner and outer arms connected at their rear ends and having their front ends resting upon the ground and formed to ride over ordinary irregularities in the surface thereof; said arms being pitched downwardly and forwardly, and a seat supported above the sled frame and rearward of the gathering arms.

4. A cotton picker's sled comprising a sled frame having a platform cut away at its rear end, a seat supported above the sled frame opposite said cut-away portion of the platform, and gathering frames flanking said sled frame and each comprising inner and outer arms connected at their rear ends and having their front ends resting upon the ground and formed to ride over ordinary irregularities in the surface thereof.

5. A cotton picker's sled comprising a sled frame having a platform cut away at its rear end, a seat supported above the sled frame rearward of said cut-away portion of the platform, and downwardly and forwardly sloping gathering frames, each comprising forwardly diverging arms united at their rear ends by an arch and terminating at their front ends in points adapted to ride over ordinary irregularities in the surface of the ground, the inner arms of said frames being secured rigidly to the sled frame.

6. A cotton picker's sled, comprising a sled frame pointed at its front end and provided at such end with a cross bar and at its rear end with an elevated seat, and provided also with a platform having its rear portion cut away, and a pair of gathering frames secured to said cross bar and each comprising forwardly diverging arms united at their rear ends by an arch and terminating at their front ends in points adapted to ride over ordinary irregularities in the surface of the ground.

7. In a cotton picker's sled, the combination of a pointed frame, to drag upon the ground and provided with an elevated seat at its rear end and a platform cut away at its rear end at a point forward of said seat, with a hoop resting upon the platform and of size to lean back against the front edge of the seat, and a sack extending under the seat and trailing upon the ground at the cut away end of the platform, and having its mouth secured to and distended by said hoop.

8. A cotton picker's sled provided at each side with a gathering frame consisting of rearwardly and upwardly converging arms, and an arch connection for the rear ends of said arms; the outer arm having a portion just forward of the arch which is bowed toward the inner arm of said frame.

9. A cotton picker's sled provided at each side with a frame consisting of rearwardly and upwardly converging arms having their front ends bent to form runners for engagement with the ground, and an arch connecting the rear ends of said arms, means for securing the inner arms of said frames rigidly to the sled near its front end, and standards secured to the sled near its rear end and to the rear ends of said inner arms.

In testimony whereof I affix my signature, in the presence of two witnesses.

THADDEUS A. WINDSOR.

Witnesses:
   H. M. WINN,
   L. L. KIBBE.